United States Patent [19]

Yamada

[11] Patent Number: 4,924,246

[45] Date of Patent: May 8, 1990

[54] ENERGIZING SYSTEM FOR VIDEO CAMERAS AND LIGHTS USING ADAPTER MODULES

[75] Inventor: Masahiro Yamada, North White Plains, N.Y.

[73] Assignee: Asahi Research Corporation, North White Plains, N.Y.

[21] Appl. No.: 250,927

[22] Filed: Sep. 29, 1988

[51] Int. Cl.$^5$ .............................................. G03B 15/03
[52] U.S. Cl. .................................... 354/126; 354/132; 358/906; 362/11; 362/227
[58] Field of Search ................. 354/126, 132; 358/229, 358/336, 906; 362/11, 13, 18, 20, 227, 229, 234, 236, 240; 363/17-26, 95-98, 124, 131-134

[56] References Cited

U.S. PATENT DOCUMENTS 4,176,932 12/1979 Young et al. ...................... 354/126
4,349,257 9/1982 Friedman et al. .................. 354/126
4,755,916 7/1988 Collins ................................ 362/236

Primary Examiner—Patrick R. Salce
Assistant Examiner—Emanuel Todd Voeltz
Attorney, Agent, or Firm—Neuman, Williams, Anderson & Olson

[57] ABSTRACT

Adapter modules are provided for use with different types of video cameras and associated battery packs to energize the cameras and also light units from the battery packs. Each module includes interconnection means for mating with those of the cameras and associated battery packs and each module includes electrical circuitry for applying proper operating voltages to the cameras and light units. The electrical circuitry includes a voltage converter circuit, which may be either a down-converter or an up-converter.

6 Claims, 5 Drawing Sheets

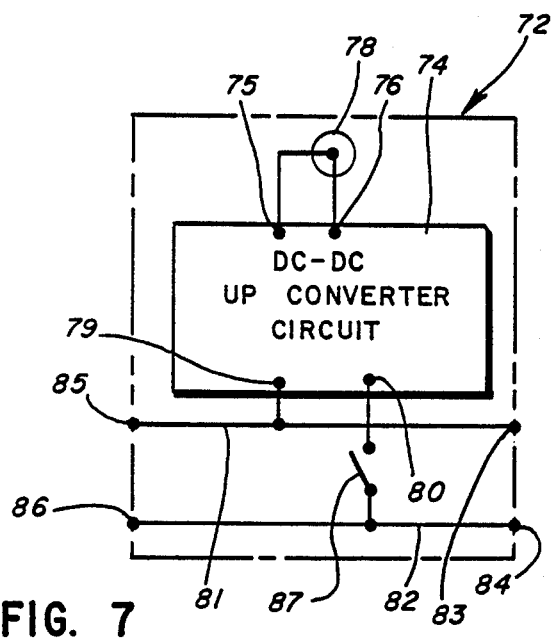
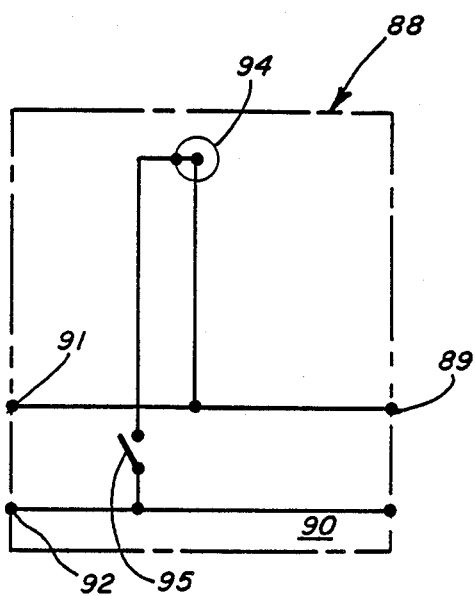
FIG. 7 FIG. 8
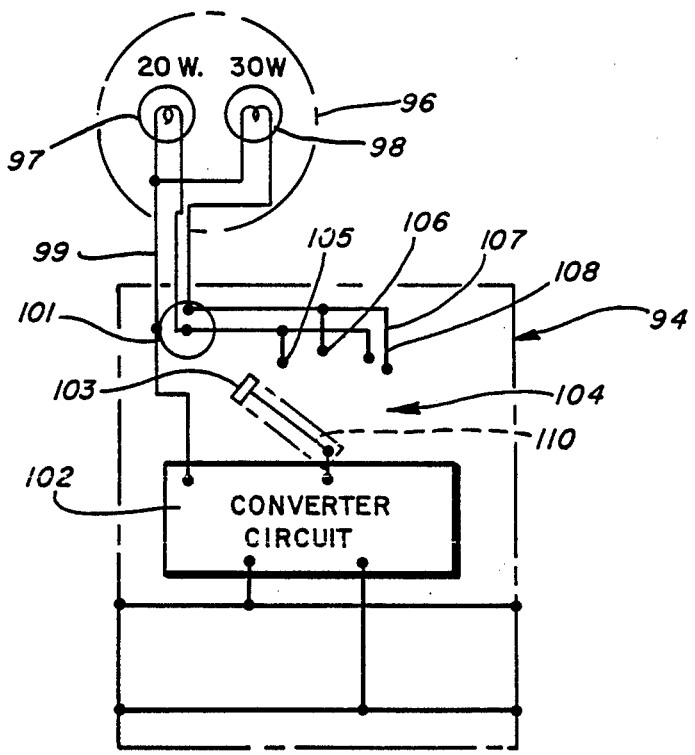
FIG. 9

ENERGIZING SYSTEM FOR VIDEO CAMERAS AND LIGHTS USING ADAPTER MODULES

BACKGROUND OF THE INVENTION

1. Field of the Invention

This invention relates to an energizing system for video cameras and lights and more particularly to a system which uses adapter modules and which makes it possible to use a light unit of a standardized type with any one of a number of different types of cameras in such a manner as to avoid waste of equipment and power, provide lower carrying weights, facilitate and make operation more convenient, lower expenses of manufacture and distribution and better meet the needs of consumers at lower costs to consumers.

2. Background of the Prior Art

There have been many important advances in design and manufacture of video cameras, including those which make it possible to operate under very low ambient light conditions. There are, nevertheless, many circumstances in which it is desirable to use a light unit in conjunction with a video camera. Typically, a light unit has been used which attached to the video camera. To energize the light unit, it is connected to a battery pack which is also attached to the camera thereby increasing the carrying weight of the camera, or it is connected through a cable to a separately carried battery pack. In either case, there are resulting inconveniences to the user. The result is that light units have been used to only a very limited extent and have not been available for use in many circumstances in which it would have been desireable to do so.

SUMMARY OF THE INVENTION

This invention was evolved with the general object of facilitating the use of light units with video cameras and overcoming disadvantages of prior arrangements.

Important aspects of the invention relate to the recognition of sources of problems with the prior art arrangements and the possibilities with respect to improvements thereon. In particular, the use of a separate battery for the light unit has seemingly been both necessary and desirable because of the power requirements of the light unit and in view of practical considerations. The constructions and designs of the many different types of video cameras on the market are such as to impose many difficulties in trying to connect a light unit to obtain power from a camera battery and in obtaining the proper voltage for operation of a light unit. It is found, however, that the battery packs of video cameras are capable of supplying power to both the camera and a light unit. The only significant effect is a reduced battery life and also that the reduction in battery life is not serious. In most cases, a light unit is not used for extended periods of time and is used only for short periods of times to obtain certain desired effects.

It is also found that problems related to connections to video cameras of various types and the supply of the proper operating voltage to the light unit can be overcome with the use of adapter modules which are constructed in accordance with this invention. In particular, an adapter module is provided for each type of camera with which a light unit is to be used, each adapter module being arranged for connection to both a camera and a battery pack and also to the light unit, and each adapter module including circuit means for supplying the proper operating voltages to both the camera and the light unit.

With the adapter modules of the invention, the need for a separate battery is eliminated. The light units can be of a standard design and construction and need not incorporate special circuitry or otherwise be special "dedicated" units usable with only one type of video camera. The required circuitry and manufacturing expense are minimized and the equipment which must be stocked by distributors and dealers in video equipment is also minimized. An owner of a video camera who desires a light unit is more likely to obtain a light unit which satisfies his needs, from stock and at lower cost. In addition, the carrying weight of the combination of a camera, light unit and power sources is minimized and there are also other important advantages including advantages relating to ease and convenience of operation and operating costs.

Specific features of the invention relate to details of the various types of modules which are provides in accordance with the invention. These features and other objects, features and advantages of the invention will become more fully apparent from the following detailed description taken in conjunction with the accompanying drawings.

BRIEF DESCRIPTION OF THE DRAWINGS

FIGS. 7, 8 and 9 illustrate three modules with three additional forms of electrical circuitry;

DESCRIPTION OF PREFERRED EMBODIMENTS

Figure 1:
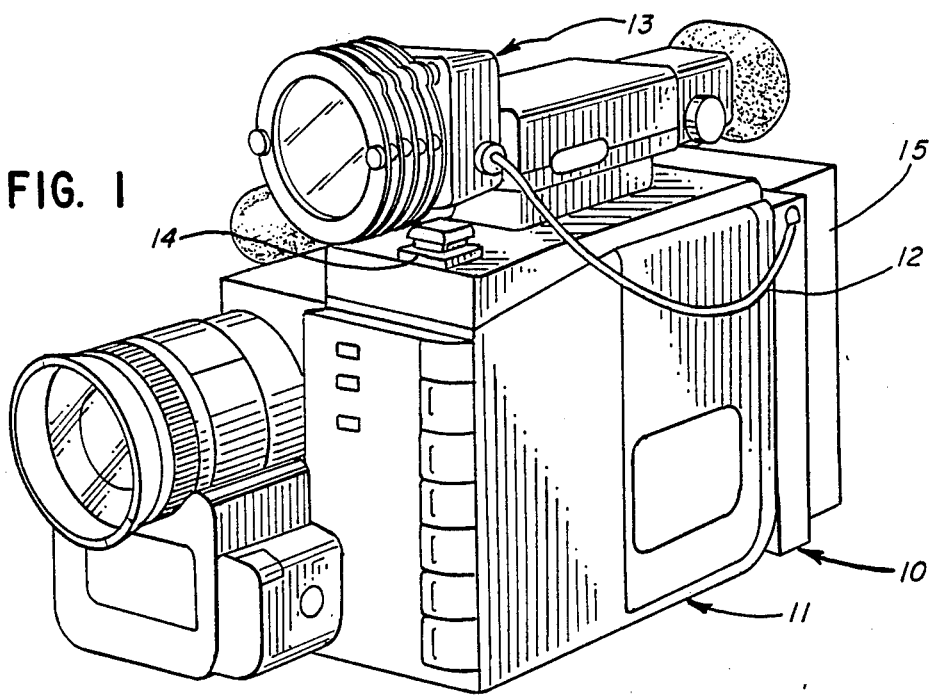
FIG. 1 is a perspective view showing an adapter module of the invention, installed between a camera and a battery pack and connected to a light unit.

In FIG. 1, reference numeral 10 generally designates one form of adapter module which is constructed in accordance with the principles of the invention and which is shown mounted on a video camera 11 and connected through a cable 12 to a video light unit 13 which is mounted on a mounting shoe 14 of the camera 11. The adapter module 10 is shown mounted on the back of the camera 11, in place of a battery pack 15 which would normally be mounted thereat, and the battery pack 15 is mounted on the back of the adapter module 10.

Figure 2:
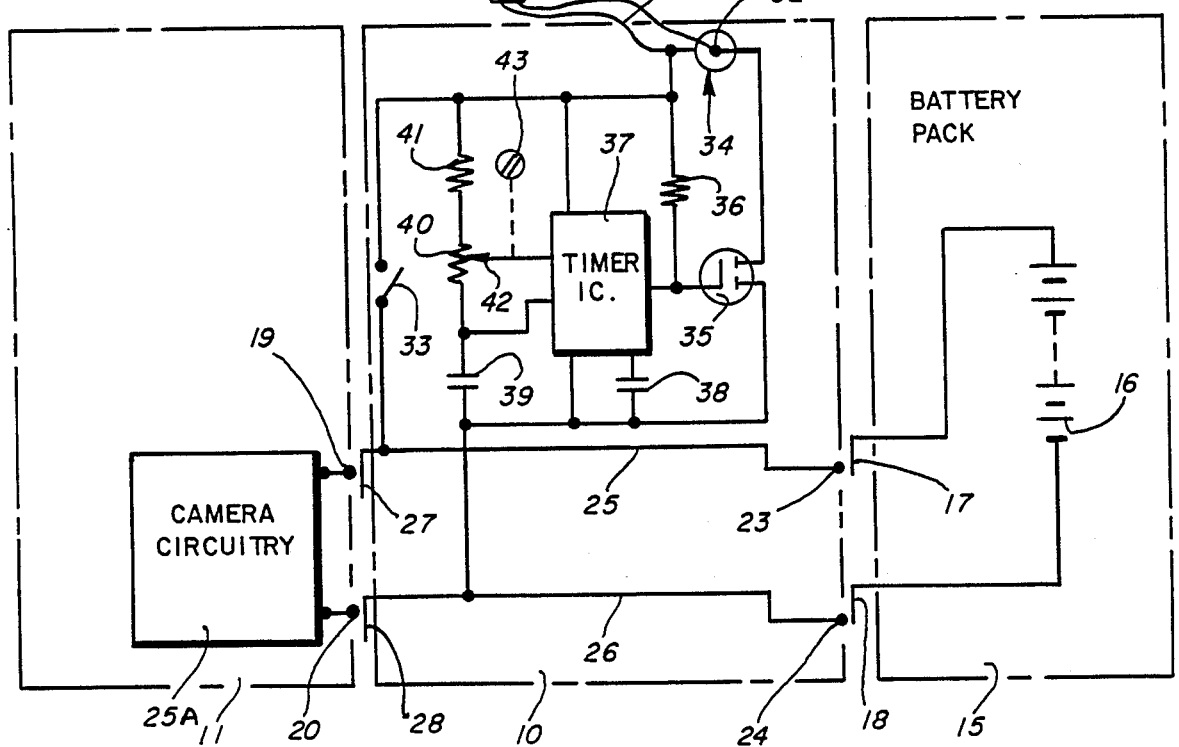
FIG. 2 is a schematic circuit diagram showing internal circuitry of the adapter module and connections to the camera and battery pack.

Circuitry, illustrated in FIG. 2, is provided in the adapter module 10 for using the battery pack 15 to supply the proper operating voltages to both the camera 11 and the light 13. In the illustrated adapter module 10, the circuitry applies the battery pack output voltage directly to the camera and applies a different lower voltage to the light 13. In particular, the illustrated battery pack 15 has a battery or batteries 16 which are connected to a pair of terminals 17 and 18. Terminals 17 and 18 would normally be engaged directly with a pair of terminals 19 and 20 of the camera 11 which are connected to circuitry 25A within the camera as shown schematically, for operation thereof. With illustrated adapter module 10 of the invention, the same voltage is applied through conductive paths through the module 10. Battery pack terminals 17 and 18 are engaged with contacts 23 and 24 of the adapter module 10 which are connected through lines 25 and 26 to a pair of contacts 27 and 28 which are engaged with the contacts 19 and 20.

A lamp 28A of the light unit is connected through conductors 29 and 30 of the cable 12 to a terminal 32 and a ground conductor of a jack 34 which is connected through an on-off switch 33 to the line 25 while terminal 32 is connected to one output electrode of a transistor 35 which has a second output electrode connected to the line 26. A control electrode of the transistor 35 is connected through a resistor 36 and switch 33 to the line 25 and is also connected to the output of an integrated circuit timer 37 which has a terminal connected directly to the line 26, a terminal connected through switch 33 to line 25, a terminal connected through a capacitor 38 to the line 26, a terminal connected through a capacitor 39 to the line 26 and also through a potentiometer 40 and a resistor 41 and switch 33 to the line 25 and a terminal connected to a movable contact 42 of the potentiometer 40.

Figure 3:
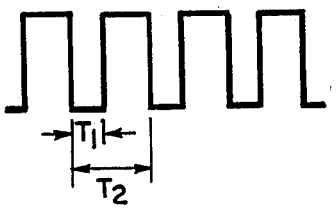
FIG. 3 shows the wave form of a signal produced at the output of an integrated circuit timer of the adapter module.

The timer 37 operates to apply pulses to the control electrode of the transistor 35 with a wave form as indicated in FIG. 3, to cause the transistor 35 to be periodically conductive and non-conductive. The duration of non-conduction is indicated as T1 while the duration of each complete cycle is indicated as T2. The duty cycle, i.e. the ratio T1/T2 is determined by the values of the components and the position of adjustment the movable contact 42 and the average voltage applied to the lamp 28A is thereby controlled to be a certain fraction of the battery voltage applied to the lines 25 and 26. By way of example, with a battery voltage of 9.6 volts, a voltage of 6 volts may be applied to the lamp 28 of the light unit 13 to match its rated voltage. Preferably, and as diagrammatically indicated, a slotted member 43 may be connected to the movable contact 42 for a factory adjustment of the voltage or for a servicing adjustment in the field.

The illustrated circuit is highly advantageous in that with the on-off switching action of the transistor 35, high efficiency is obtained, there is very little power or heat loss in the adapter module 10 and current drain of the battery pack is minimized. Thus the light unit 13 can be operated at the proper voltage and with high efficiency, using the same battery pack as used for the camera. No separate battery pack is required for the light unit 13, and the carrying weight is minimized.

Figure 4:
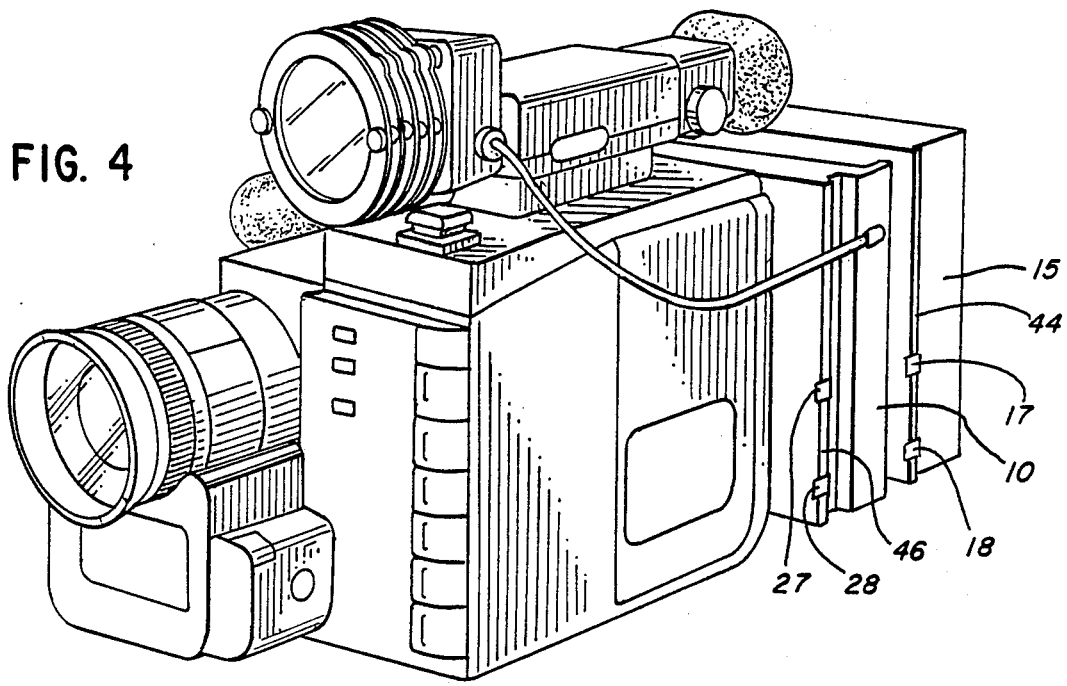
FIG. 4 is a view similar to FIG. 1 but showing the module separated from the camera and battery pack, to more clearly depict the physical construction.

FIG. 4 is a view similar to FIG. 1 but showing the module 10 separated from the camera 11 and battery pack 15, to more clearly depict the physical construction. The battery pack 15 may have flanges along opposite sides thereof arranged to slide downwardly into channels formed on the back of the camera 11 during installation of the battery pack 15. One of such flanges is shown in FIG. 4 and is designated by reference numeral 44. It has the contacts 17 and 18 thereon positioned for engagement with camera contacts 19 and 20 which are not shown in FIG. 4 but which are positioned along the channels formed in the camera back. The back of the module 10 is like the back of the camera in having channels for receiving the flanges of the battery pack and in having the contacts 27 and 28 thereof along such channels for engagement by the battery pack contacts 17 and 18. The front of the module 10 is like the front of the battery pack 15 in having a pair of side flanges including a flange 46.

Figure 5:
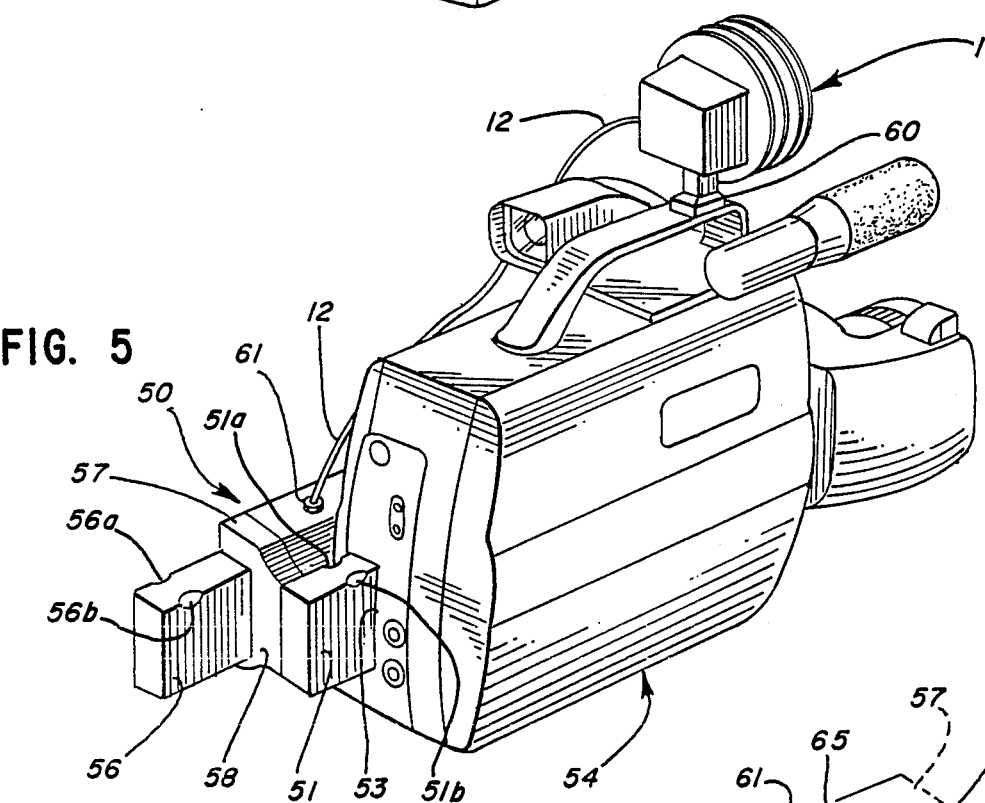
FIG. 5 is a perspective view showing another form of adapter module of the invention, shown with a dummy portion thereof partially inserted into a battery pack receiving slot of a camera and showing a battery pack partially inserted into the module.

FIG. 5 is a perspective view showing another form of adapter module which is generally designated by reference numeral 50 and which is constructed in accordance with the principles of the invention. The module 50 includes a dummy portion 51, shown partially inserted into a battery pack receiving slot 53 of a camera 54 which has a construction different from the camera 11. A battery pack 56 of a type designed to be inserted into the slot 53 of camera 54 is shown partially inserted into a slot in a portion 57 of the module 50. As shown, one end of portion 57 is connected to one end of the dummy portion 51 through a connector portion 58 which extends transversely a distance sufficient to position the pack-receiving portion 57 on the outside and along the camera body.

Dummy portion 51 has generally the same size and external configuration as the battery pack 56 and includes a pair of notches 51a and 51b for engagement by releasable retainer elements within the body of camera 54, similar to notches 56a and 56b of the illustrated battery pack 56. Dummy portion 51 is somewhat longer than the pack 56 to include an end portion which is connected to the connector portion 58 and which is outside the camera body when the remaining portion thereof is inserted fully inserted into the slot 53.

The light unit 13 is mounted on a mounting shoe 60 of the camera 54 and is connected through the cable 12 to a jack 61 on the module 50. An electrical circuit arrangement is shown diagrammatically in FIG. 6. A pair of contacts 63 and 64 on opposite sides of the dummy portion 51 are engageable with internal contacts of the camera 54 and are connected through conductors 65 and 66 to contacts 67 and 68 within the battery pack-receiving portion 57 of the module, such contacts 67 and 68 being positioned to engage contacts of the battery pack 56. A circuit board 70, which may preferably be mounted in the dummy portion 51, is connected to the conductors 65 and 66 and to terminals of the jack 61 for supplying the proper voltage to the lamp. Circuit board 70 may include voltage-reducing circuitry such as shown in FIG. 3 or other alternative forms of circuitry as hereinafter described, as required for operation of the light unit 13 from the battery pack 56.

Figure 6:
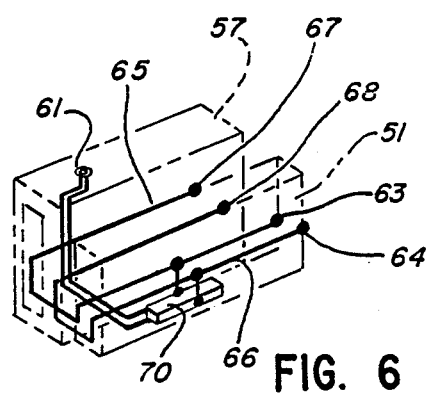
FIG. 6 is a view showing electrical connections of the module of FIG. 5.

The module 10 of FIGS. 1-4 and the module 50 of FIGS. 5 and 6 are representative of types of modules which may be provided in accordance with the invention. It will be understood that other modules are provided in accordance with the invention, having physical constructions and dimensions which match those of the particular commercial types of cameras with which the light unit 13 is to be used. It will be understood that electrical circuitry is provided in each module of the invention according to the battery voltage of the particular commercial type of camera with which the light unit is to be used.

In general, it is desirable to use switching converters of a down type such as shown in FIG. 3, operative to reduce a battery voltage to a lower voltage for operation of a light unit and it is therefore desirable to use a light unit requiring a relatively low voltage, e.g. 6 volts. However, the invention is not limited to use of a down-converter. FIG. 7 illustrates a module 72 which includes a DC-DC up-converter circuit 74 having output terminals 75 and 76 connected to a jack 78 for connection to the light unit 13 and having input terminals 79 and 80 connected to conductors 81 and 82 which are connected between battery pack connect terminals 83 and 84 and camera connect terminals 85 and 86. Preferably, an on-off switch 87 is provided between terminal 80 and line 82. The converter circuit 74 is a high efficiency switching type converter circuit, operate to increase a battery voltage, such as 6, 7.2 or 9.6 volts, to a higher voltage, such as 12 volts, for operation of a light unit which requires a voltage higher than available from battery pack for the particular camera with which the module is to be used.

FIG. 8 illustrates a module 88 which is used when the battery pack voltage is the same as the light unit voltage. Direct connections are provided as shown between battery pack connect terminals 89 and 90 and camera connect terminals 91 and 92 and a jack 94 is connected to the terminals 89 and 90 through an on-off switch 95.

FIG. 9 illustrates a module 94 for use with a light unit 96 which includes two lamps 97 and 98 having different wattage ratings, e.g. 20 watts and 30 watts, as shown. The lamps are connected through a three conductor cable 99 to a jack 101 having one terminal connected to terminals of both lamps 97 and 98 and also to one output of a converter circuit 102, a second output terminal of converter circuit 102 being connected to a rotatable blade 103 of a switch 104, illustrated in an "off" position. In a first "on" position blade 103 engages a contact 105 which is connected only to the lamp 97 with the lower wattage rating. In a second "on" position, the blade 103 engages a contact 106 which is connected to the lamp 98 with the higher wattage rating. In a third "on" position, the blade engages two contacts 107 and 108 which are connected to the two lamps 97 and 98, thereby energizing both lamps. Thus three lighting levels are selectively obtained with two lamps of a single light unit. As diagrammatically shown a manually actuatable knob 110 is connected to blade 103 is located on the outside of the module 94 for operation by the user.

Figure 10:
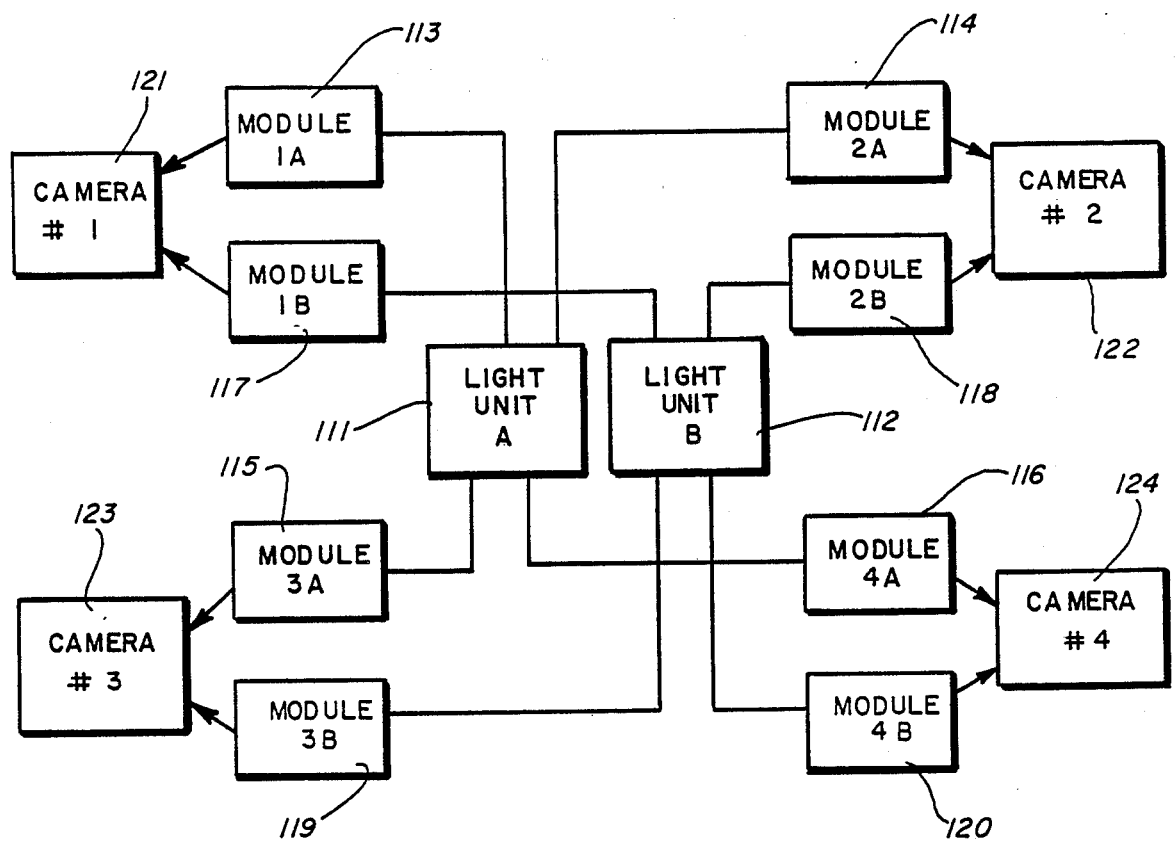
FIG. 10 illustrates a system and method of the invention.

FIG. 10 illustrates a system and method of the invention. "A" and "B" light units 111 and 112 are connectable through "1A", "2A", "3A" and "4A" modules 113–116 or through "1B", "2B", "3B" and "4B" modules 117–120 to "#1", "#2", "#3"and "#1" cameras 121–124. Each of the modules is constructed using principles as embodied in one or more of the illustrated modules and has physical and electrical characteristics such as to properly mate and connect to the camera and such as to apply the proper voltages to the camera and light unit. With this system and with the adapter modules of the invention, the need for a separate battery is eliminated in each case. The number of required types of light units is minimized and each can be of a standard design and construction and need not incorporate special circuitry or otherwise be special "dedicated" units usable with only one type of video camera. The required circuitry and manufacturing expense are minimized and the equipment which must be stocked by distributors and dealers in video equipment is also minimized. An owner of a video camera who desires a light unit is more likely to obtain a light unit which satisfies his needs, from stock and at lower cost. In addition, the carrying weight of the combination of a camera, light unit and power sources is minimized and there are also other important advantages including advantages relating to ease and convenience of operation and operating costs.

An additional very important advantage of the invention is that each of the adapter modules is usable alone for powering a light unit, independently of the video camera whenever desired. No separate battery is ever required for the light unit.

Figure 11:
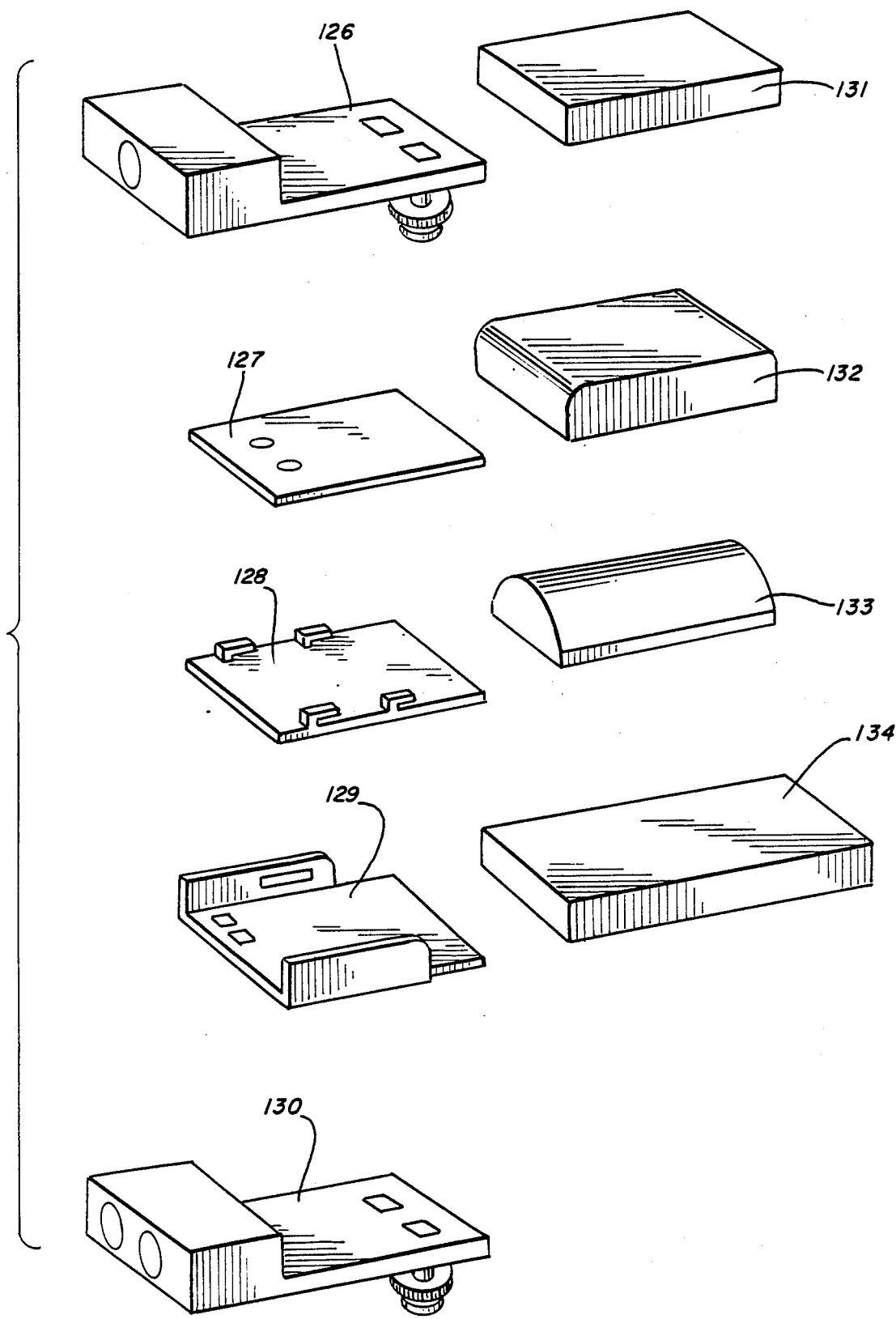
FIG. 11 illustrates the form of adapter modules for a plurality of current commercial types of cameras.

FIG. 11 illustrates adapter modules 126–130 of five different forms for use with battery packs 131–134 for four current types of video cameras as indicated. The module 130 has two output jacks for separate connection to lamps of one two lamp light unit or for connection to two light units, if desired.

It will be understood that modifications and variations may be effected without departing from the spirit and scope of the novel concepts of this invention.

I claim:

1. A plurality of adapter modules for use with light units of similar construction and with a plurality of different types of video cameras and battery packs respectively associated with said cameras, each camera and pack having mating interconnection means, each of said modules being associated with one of said cameras and each comprising one interconnection means arranged to mate with interconnection means of the associated camera and a second interconnection means arranged to mate with interconnection means of the battery pack associated with the associated camera, and each of said modules having electrical circuitry for applying the proper operating voltages from said associated battery pack to said associated camera and to a light unit.

2. Adapter modules as defined in claim 1, wherein at least one of said modules includes a voltage converter circuit for applying to a light unit a voltage different from the voltage applied thereto from said associated battery pack.

3. Adapter modules as defined in claim 2, wherein said converter circuit is a down-converter operative to apply a voltage to a light unit which is lower than the voltage applied thereto from said associated battery pack.

4. Adapter modules as defined in claim 1, wherein said converter circuit is an up-converter operative to apply a voltage to a light unit which is higher than the voltage applied thereto from said associated battery pack.

5. Adapter modules as defined in claim 1, each connected to a light unit wherein said light units include at least one two-lamp light unit with two lamps having different wattage ratings, each adapter module for use with said two-lamp light unit having switching means for selective use of either of said lamps alone or both together to obtain three lighting levels.

6. A method, using adapter modules as defined in claim 1 for energizing a plurality of light units from battery packs associated with a plurality of different types of cameras.

* * * * *